UNITED STATES PATENT OFFICE.

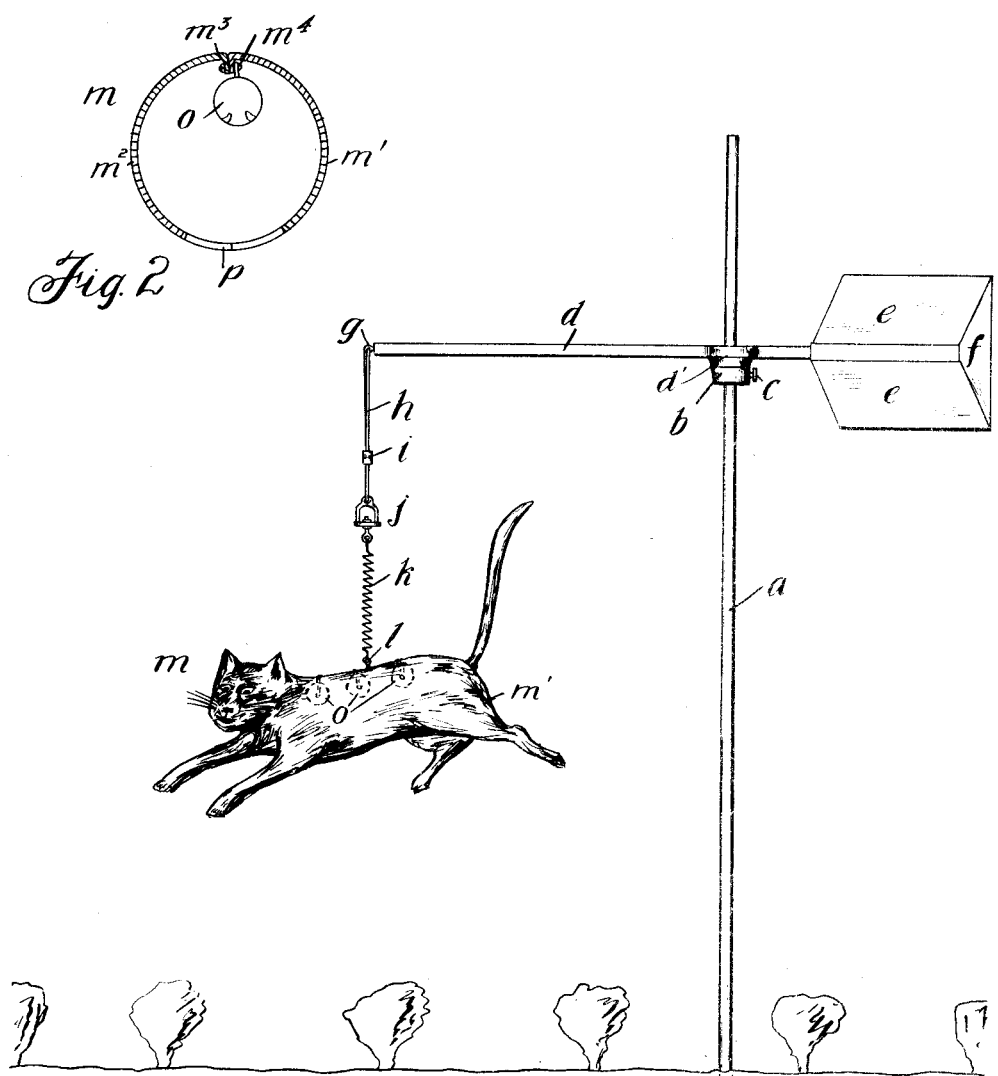

HUGH HUFFMAN AND ERNEST J. PECK, OF PORTLAND, OREGON.

SCARECROW.

1,167,502.

Specification of Letters Patent.

Patented Jan. 11, 1916.

Application filed July 8, 1915. Serial No. 38,801.

*To all whom it may concern:*

Be it known that we, HUGH HUFFMAN and ERNEST J. PECK, citizens of the United States, and residents of Portland, county of Multnomah, and State of Oregon, have invented a new and useful Improvement in Scarecrows, of which the following is a specification.

This invention relates to scare crows which are adapted to be used in a garden patch, field, or orchard for the purpose of scaring away intruding birds or animals which might eat or otherwise injure the crop.

Prior to our invention, the scare crows ordinarily used were crude affairs, being generally home-made and not wholly satisfactory.

One of the main objects of our invention is to provide a more efficient form of scare crow consisting of a figure formed to resemble a living animal in the posture of approaching its prey. The means of mounting this scare crow are so arranged that the action of the wind will give various motions to the figure which will simulate the lifelike movements of the animal. The figure is also provided with an audible alarm which will sound in accordance with the movements of the figure, so as to attract the attention of the intruding birds or animals.

The features of our invention are all fully set forth in the accompanying drawings, in which, Figure 1 is an elevation showing the scare crow of our invention as it is used in actual practice, and Fig. 2 is a cross sectional elevation through the body of the figure showing the construction of same.

Referring now to these drawings, $a$ represents a standard of circular cross section provided with a pointed end which is adapted to be thrust firmly into the ground so as to hold the standard in upright position. A set collar $b$, is slidable on the standard $a$, and may be held in any position by means of the set screw $c$.

$d$ is a lateral arm provided with a hub $d'$ which is adapted to rest on the set collar $b$, and is rotatable on the longitudinal axis of the standard. On one end of the arm $d$ are fixed the wind vanes $e$, and the counter weight $f$, which holds the rotatable member in balanced position. The wind acting on the vanes $e$ will cause the arm $d$ to rotate about the standard $a$. On the other end of the arm $d$ is an eye-screw $g$, and a flexible slip cord $h$, provided with a friction sleeve $i$, is suspended from said eye-screw. On the lower end of the cord $h$ is a swivel element $j$, to the lower member of which is fixed a pendent tension spring $k$.

The scare crow proper consists of a figure $m$ formed in this instance to represent a cat or other feline animal. The figure $m$ is provided with a screw-eye $l$ to which the lower end of the spring $k$ is fastened, and so located that the figure is maintained in poised position.

Referring to Fig. 2, it is seen that the body of the figure comprises the pressed out members $m'$ and $m^2$, which are made with inwardly turned flanges $m^3$, adapted to be clamped together by the bolts $m^4$. A plurality of bells $o$, which may be of any convenient type, are suspended from the bolts $m^4$, and the lower portion of the figure is provided with an open space $p$ through which this sound caused by the jingling of the bells will be emitted.

The general operation of the device is as follows: The standard $a$ is placed in upright position in any convenient place in the field or garden, and the set collar $b$ is adjusted so as to bring the cross arm $d$ to the proper elevation for the wind vanes $e$ to be acted upon most effectively. The cord $h$ is then adjusted so as to place the figure $m$ at the proper elevation. The consequent rotations of the arm $d$ will impart a swinging and swaying motion to the figure $m$, through the flexible cord $h$. The swivel $j$ will allow the figure to swing also in horizontal plane relative to the cord $h$, and the spring $k$ which is very sensitive, will cause the figure to be given an irregular jumping motion. In this way, the figure will be given a great variety of irregular movements which will simulate life in the figure, and the ringing of the bells will furthermore act as an audible alarm to attract the attention of any intruding birds or animals.

Having thus described the general construction and operation of our invention, we claim:

1. A scare-crow comprising a standard, a rotatable arm adjustably mounted on the standard, wind vanes on one end of said arm, a flexible supporting element fixed to the other end of said arm, including a spring and a swivel, and a figure supported by said flexible element.

2. A scare-crow comprising a standard, a rotatable arm adjustably mounted on the standard, wind vanes on one end of said arm, a flexible supporting element fixed to the other end of said arm, including a spring and a swivel, a figure supported by said spring, and an audible alarm carried by the figure.

3. A scare-crow comprising a standard, a rotatable arm adjustably mounted on the standard, wind vanes on one end of said arm, an adjustable, flexible supporting element fixed to the other end of said arm, including a spring and a swivel, a feline figure supported by the said element, and sounding bells carried by the figure.

4. A scare-crow comprising a standard, a rotatable arm adjustably mounted on the standard, wind vanes on one end of said arm, an adjustable cord fixed to the other end of said arm, a spring and swivel suspended by said cord, and a feline figure supported by the spring.

HUGH HUFFMAN.
ERNEST J. PECK.